United States Patent [19]

Nakane et al.

[11] Patent Number: 5,587,417
[45] Date of Patent: Dec. 24, 1996

[54] RUBBER COMPOSITION FOR TIRE TREAD

[75] Inventors: Shinsuke Nakane; Kazuhiko Kanou; Takatsugu Hashimoto, all of Tokyo, Japan

[73] Assignee: Bridgestone Corporation, Tokyo, Japan

[21] Appl. No.: 403,720

[22] PCT Filed: Jul. 14, 1993

[86] PCT No.: PCT/JP93/00971

§ 371 Date: Mar. 14, 1995

§ 102(e) Date: Mar. 14, 1995

[87] PCT Pub. No.: WO93/19578

PCT Pub. Date: Oct. 14, 1993

[51] Int. Cl.$^6$ ............................................. C08K 3/00
[52] U.S. Cl. ........................... 524/495; 524/322; 524/496
[58] Field of Search ........................... 524/322, 495, 524/496

[56] References Cited

U.S. PATENT DOCUMENTS 4,895,911  1/1990  Mowdood et al. .................... 525/346

FOREIGN PATENT DOCUMENTS 2182737  7/1990  Japan .

OTHER PUBLICATIONS

"Carbon Blacks"; Cabot Corporation (1989).

*Primary Examiner*—Edward J. Cain
*Attorney, Agent, or Firm*—Sughrue, Mion, Zinn, Macpeak & Seas

[57] ABSTRACT

A rubber composition for a tire tread which is provided by the present invention can be obtained by blending 100 parts by weight of a natural rubber and/or a diene synthetic rubber with 40 to 100 parts by weight of a carbon black having characteristic values of a cetyltriammonium bromide adsorption specific surface area (CTAB) being 90 to 220 $m^2$/g and a 24M4DBP absorption value being 90 to 140 ml/100 g, and 0.1 to 20 parts by weight of an organic unsaturated fatty acid having two or more carbon double bonds in its molecule which includes 10% by weight or more of a conjugated diene acid having at least one pair of two carbon double bonds in a conjugated relation in its molecule.

This rubber composition for a tire tread can be suitably used for a pneumatic tire, particularly a pneumatic tire for heavy load having an excellent wear resistance.

6 Claims, No Drawings

1

RUBBER COMPOSITION FOR TIRE TREAD

TECHNICAL FIELD

The present invention relates to a rubber composition for a tire tread, and particularly, it relates to a rubber composition for a tire tread suitable for a pneumatic tire for heavy load having excellent wear resistance.

BACKGROUND ART

Heretofore, as a filler for a rubber having a high reinforcing effect, a carbon black of an ISAF class is well known. However, in the pneumatic tire for heavy load in recent years, the carbon black which can improve wear resistance has been desired in accordance with demands of improved case durability, resource saving and good mileage.

Thus, the carbon black which can be used as the filler in the rubber composition for the tread of the tire for heavy load has also changed from the ISAF class to an SAF class.

By the way, in order to improve the wear resistance of rubber products such as the tires, it is already known that a high structure carbon black having a fine particle diameter is suitable.

The diameter of the fine particles of the carbon black can be determined by measuring the particles in an electron micrograph, but the thus measured particle diameter is an average value and in fact, it has a certain distribution.

Alternatively, the particle diameter can also be calculated by measuring the surface area of the carbon black, and for this measurement, an $N_2SA$ method for determining from the amount of an adsorbed nitrogen gas and an iodine adsorption method (an IA method) are simple. These methods have been routinely employed in a quality control of a maker, an acceptance test of a user, and the like.

In measuring the surface area, a point to which much attention should be paid is whether a value obtained by the measurement principle denotes a whole surface area or an external surface area.

It is considered that small pores are present on the surfaces of the carbon black, and the whole surface area also includes the surface area in the pores, but the external surface area does not include the surface area in the pores. When the carbon black is kneaded as a reinforcing agent with a rubber, such giant molecules as in the rubber cannot get into the pores, and for this reason, the surface of the pores cannot be effectively utilized in practice.

Therefore, the external surface area of the carbon black is also called a rubber effective surface area sometimes. In order to determine this rubber effective surface area, there is used a surface area calculated from an amount of adsorbed cetyltriammonium bromide (CTAB) having a large molecular weight. This is called a CTAB method surface area. This CTAB method surface area has a unit of $m^2/g$, and it can be measured in accordance with ASTM D-3765-89.

On the other hand, the particles of the carbon black are not present singly but integrally like bunches of grapes, as seen from an electron microscope. This is called a structure. This structure can be classified into two kinds, and one is established by the mutual fusion of the particles, i.e., a chemical bond and the other is established by a physical bond such as a van der Waal force. The former non-destructive structure morphology is called a primary structure, and the latter deformable and destructive structure morphology is called a secondary structure. The structure can usually be evaluated by an absorption value of dibutyl phthalate (DBP). This principle is based on a phenomenon that the carbon black having high entanglement properties among the particles can absorb a larger amount of an oil.

A 24M4DBP absorption value is a value obtained by repeating a compression operation at a pressure of 24,000 psi four times and then measuring a DBP absorption value in accordance with ASTM D-3493, and this absorption value is an index for evaluating the skeleton structure properties of the carbon black mainly comprising the primary structure, used in measuring the DBP absorption value, on the basis of the non-destructive real structure morphology (the primary structure) to the exclusion of the DBP absorption value by the deformable and destructive structure morphology (the secondary structure) formed by the so-called van der Waal force.

In order to improve the wear resistance by adding the carbon black to the rubber, it is required that the carbon black is brought into fine particles. However, if the carbon black is pulverilzed more finely than in SAF to form a higher structure, the dispersibility of the carbon black deteriorates noticeably in the blended rubber. Therefore, such an improvement of the wear resistance as to be expected cannot be observed, and nowadays, the improvement of the wear resistance has already reached a substantial limit. Furthermore, if the carbon black is pulverized more finely than in SAF to form a higher structure, the viscosity of the unvulcanized rubber becomes very high, so that workability deteriorates noticeably.

On the other hand, as a method for improving the wear resistance without using the carbon black, there is a means using cis-1,4-polybutadiene rubber (hereinafter referred to simply as "high-cis BR"). In order to improve the wear resistance by the use of the high-cis BR, means such as the increase of a molecular weight, the betterment of the linearity of a polymer and the reduction of a molecular weight distribution have been heretofore taken. However, as in the case of the formation of the carbon black having the fine particle size, the dispersibility of the carbon black deteriorates noticeably in the blended rubber. Therefore, such an improvement of the wear resistance as to be expected is not observed, and nowadays, the improvement of the wear resistance has reached a substantial limit. Furthermore, the viscosity of the unvulcanized rubber becomes very high, so that workability deteriorates noticeably.

For the purpose of improving the dispersibility of the carbon black and inhibiting the viscosity of the unvulcanized rubber from increasing, there have been heretofore added various kinds of softening agents and plasticizers such as cotton seed oil, soybean oil, pine oil, aroma oil, nathphenic oil and dioctyl phthalate. The addition of the softening agent and the plasticizer can improve the dispersibility and inhibit the increase of the viscosity, but the wear resistance deteriorates conversely.

Furthermore, it has also be attempted to utilize a reactive softening agent and plasticizer with the intention of improving the dispersibility and inhibiting the increase of the viscosity. In this case, the wear resistance can be improved as compared with the employment of the above-mentioned softening agent and plasticizer, but the degree of its improvement is not sufficient and it is the most to stem the deterioration of the wear resistance.

We have intensively investigated in view of this point, and we have suggested a rubber composition having improved static mechanical strength obtained by blending, as a vulcanizing accelerator, a specific unsaturated fatty acid, i.e., an organic unsaturated fatty acid including two or more carbon double bonds in the molecule which includes 5% by weight or more of a conjugated diene acid having at least one conjugated carbon-carbon double bond in its molecule (Japanese Patent Application Laid-open No. 189850/1992).

However, when the specific unsaturated fatty acid is merely added, the improvement effect of dynamic mechanical strength, particularly the wear resistance is poor, though the static mechanical strength can be improved. Thus, a further beneficial suggestion has been desired.

DISCLOSURE OF THE INVENTION

SUMMARY OF THE INVENTION

The present invention has been developed to solve the above-mentioned problems of conventional techniques, and an object of the present invention is to provide a rubber composition for a tire tread particularly in a pneumatic tire for heavy load which is remarkably improved in wear resistance.

The present inventors have paid much attention to a conception that an organic unsaturated fatty acid having a conjugated diene acid which is effective to improve static destructive properties as a vulcanizing accelerator for a rubber composition of car tire itself would be effective to prevent the deterioration of carbon black dispersibility and the increase of viscosity which disturbs the improvement of wear resistance, and they have intensively investigated. As a result, it has been found that when a specific carbon black is restrictively used in a combination of a natural rubber and a diene synthetic rubber and when the above-mentioned organic unsaturated fatty acid having the conjugated diene acid is blended, a rubber composition for a tire tread which is more excellent in wear resistance than in the conventional cases can be obtained. As a result of further researches, the present invention has been completed.

That is to say, a rubber composition for a tire tread of the present invention is obtained by blending 100 parts by weight of a natural rubber and/or a diene synthetic rubber with

- 40 to 100 parts by weight of a carbon black having characteristic values of a cetyltriammonium bromide adsorption specific surface area (CTAB) being 90 to 220 m$^2$/g and a 24M4DBP absorption value being 90 to 140 ml/100 g and
- 0.1 to 20 parts by weight of an organic unsaturated fatty acid having two or more carbon double bonds in the molecule which includes 10% by weight or more of a conjugated diene acid having at least one conjugated carbon-carbon double bond in its molecule.

The carbon black preferably has a cetyltriammonium bromide adsorption specific surface area (CTAB) of 120 to 220 m$^2$/g and a 24M4DBPP absorption value of 100 to 140 ml/100 g.

The diene synthetic rubber is preferably one selected from the group consisting of a polybutadiene, a styrene•butadiene copolymer rubber, a synthetic polyisoprene rubber, a chloroprene rubber, a butyl rubber and an ethylene•propylene terpolymer rubber.

The content of the conjugated diene acid in the organic unsaturated fatty acid is preferably 25% by weight or more.

The natural rubber and/or the high-cis BR is preferably contained in an amount of 70% by weight or more in 100 parts by weight of the total rubber components.

The high-cis BR preferably has characteristic values of the following (a):

(a) an Mw is 400,000 or more and an Mw/Mn is less than 4.0 wherein the Mw is a weight-average molecular weight and an Mn is a number-average molecular weight.

A mixing ratio of the natural rubber and the high-cis BR is preferably such that the amount of the natural rubber is 70% by weight or more.

Detailed Description of the Invention

A rubber which can be used in the present invention is fundamentally a natural rubber and/or a diene synthetic rubber. Examples of the usable diene synthetic rubber include a polybutadiene rubber (BR), a styrene•butadiene copolymer rubber (SBR), a synthetic polyisoprene rubber, a chloroprene rubber (CR), a butyl rubber (IIR) and an ethylene•propylene•diene three-dimensional copolymer rubber (EPDM).

Among the diene synthetic rubbers, a high-cis BR is particularly preferable, and in the case of a combination of the natural rubber (NR) and the high-cis BR, a ratio of the natural rubber (NR) to the high-cis BR is 80/20 to 30/70, preferably 70/30 to 40/60. In addition, the amount of the combination of the natural rubber and the high-cis BR is 70% by weight or more, preferably 80% by weight or more, more preferably 85% by weight or more. If the amount of the high-cis BR is less than the above-mentioned range, the effect of wear resistance is poor.

As the rubber component for use in the natural rubber and the high-cis BR, at least one rubber which can be selected from the group consisting of the above-mentioned SBR, BR, CR, IIR and EPDM can be used in an amount of 30% by weight, preferably 20% by weight, more preferably 15% by weight.

In the high-cis BR, it is required that an Mw is 400,000 or more and an Mw/Mn is less than 4.0, wherein the Mw is a weight-average molecular weight and an Mn is a number-average molecular weight. If the Mw is less than 400,000 and the Mw/Mn is 4.0 or more, the wear resistance deteriorates unpreferably.

The Mw is in the range of 400,000 to 2,000,000, preferably 500,000 to 1,500,000, more preferably 500,000 to 1,000,000, and the Mw/Mn is less than 4.0, preferably less than 3.5.

Furthermore, in the high-cis BR which meets the above-mentioned Mw and Mw/Mn, an $ML_{1+4}$ (100° C.) is 38 or more, preferably in the range of 40 to 120. If the $ML_{1+4}$ (100° C.) is less than 38, the wear resistance deteriorates unpreferably.

Moreover, a bonded cis content of the high-cis BR is preferably 90% or more, more preferably 93% or more.

A carbon black which can be used in the present invention is required to have characteristic values, i.e., a CTAB method surface area of 90 to 220 m$^2$/g, preferably 120 to 220 m$^2$/g, and a 24M4DBP absorption value of 90 to 140 ml/100 g, preferably 100 to 135 ml/100 g.

If the CTAB and the 24M4DBP of the carbon black are outside the range of 90 to 220 m$^2$/g and the range of 90 to 140 ml/100 g, respectively, the wear resistance effect of the present invention cannot be exerted sufficiently.

The rubber composition of the present invention is required to contain the carbon black having the above-mentioned characteristic values in an amount of 40 to 100 parts by weight, preferably 45 to 80 parts by weight, more preferably 48 to 70 parts by weight. If the amount of the carbon black is less than 40 parts by weight or more than 100 parts by weight, the wear resistance effect of the present invention cannot be exerted sufficiently.

In the organic unsaturated fatty acid which can be used in the present invention, "a conjugated diene acid" means an organic unsaturated monocarboxylic acid having at least one conjugated carbon-carbon double bond in its molecule, and the conjugated diene acid preferably has one pair of the carbon double bonds in the conjugated relation, but it may have two or more pairs of the carbon double bonds in the conjugated relation.

The organic unsaturated fatty acid containing 10% by weight or more of the conjugated diene acid and having two or more carbon double bonds in the molecule (hereinafter referred to simply as "organic unsaturated fatty acid"), needless to say, contains the conjugated diene acid, but the other organic unsaturated fatty acids each contain two or more carbon double bonds, which are not in the mutually conjugated relation.

The content of the conjugated diene acid in the organic unsaturated fatty acid is 10% by weight or more, preferably 25% by weight or more, more preferably 35% by weight or more.

If the content of the conjugated diene acid is less than 10% by weight, the wear resistance effect of the present invention cannot be exerted sufficiently. Conversely, if the content of the conjugated diene acid is 25% by weight or more, the wear resistance effect can be exerted more effectively.

Examples of the conjugated diene acid include 2,4-pentadienoic acid, 2,4-hexadienoic acid, 2,4-decadienoic acid, 2,4-dodecadienoic acid, 9,11-octadecadienoic acid, α-eriostearic acid, 9,11,13,15-octadecatetraenoic acid and 9,11,13-octadecatrienoic acid.

A preferable example of the organic unsaturated fatty acid containing the conjugated diene acid is a dehydrated castor oil fatty acid obtained by subjecting castor oil to a dehydration reaction. Furthermore, the content of the conjugated diene acid can be changed by selecting a dehydration manner, and for example, the organic unsaturated fatty acid containing 35% by weight or 60% by weight of the conjugated diene acid can be obtained.

In this dehydrated castor oil fatty acid, 9,11-octadecadienoic acid is mainly contained as the conjugated diene acid. In the other organic unsaturated fatty acid, non-conjugated octadecadienoic acid is mainly contained, and additionally, linoleic acid or linolenic acid can also be contained. In the present invention, in addition to the dehydrated castor oil fatty acid, a fatty acid typified by stearic acid which has been heretofore used may be used together.

The organic unsaturated fatty acid which can be used in the present invention preferably contains 75% by weight or more of an unsaturated fatty acid having a long-chain alkyl group having 10 to 22 carbon atoms, preferably 12 to 20 carbon atoms in the total unsaturated fatty acid. If the unsaturated fatty acid having 10 to 22 carbon atoms is used, a high modulus of elasticity can be obtained.

Furthermore, it is preferred that an unsaturation degree of the total unsaturated fatty acid is in the range of 130 to 180 in terms of an iodine value. If the iodine value is in the range of 130 to 180, the high modulus of elasticity can be obtained.

In the rubber composition of the present invention, the above-mentioned organic unsaturated fatty acid is required to be contained in the range of 0.1 to 20 parts by weight, preferably 0.3 to 10 parts by weight, more preferably 0.5 to 4 parts by weight. If the content of the organic unsaturated fatty acid is less than 0.1 part by weight or more than 20 parts by weight, the wear resistance effect of the present invention cannot be exerted sufficiently.

The rubber composition for the tire tread of the present invention can be blended with a softening agent in addition to the organic unsaturated fatty acid, and the amount of the softening agent to be blended is 10 parts by weight or less, preferably 6 parts by weight or less.

In the present invention, additives can be suitably used in addition to the above-mentioned materials to be blended, and these additives are those which can usually be used as additives for the rubber. Examples of the additives include a vulcanizing agent, a vulcanizing accelerator, a vulcanizing acceleration auxiliary, an antioxidant and a foaming agent.

BEST MODE FOR CARRYING OUT THE INVENTION

EXAMPLES

Next, the present invention will be described in more detail with reference to examples and comparative examples, but the scope of the present invention should not be limited to these examples.

(1) Preparation of a rubber composition for a tire tread

Examples 1 to 3 and Comparative Examples 1 to 14

In accordance with blend ratios in Tables 1 to 3, materials other than sulfur and a vulcanizing accelerator were mixed with a raw material rubber (a natural rubber) in a Banbury type internal mixer, and sulfur and the vulcanizing accelerator were then added to the resultant master batch in an open roll mill to prepare rubber compositions for tire treads. Tables 1 to 3 show the measured results of tests, i.e., wear resistance, workability and carbon dispersibility of the respective rubber compositions.

Examples 4 to 10 and Comparative Examples 15 to 36

In accordance with blend ratios (blend unit: parts by weight) in Tables 4 to 8, materials other than sulfur and a vulcanizing accelerator were mixed with raw material rubbers (a natural rubber and a high-cis BR) in a Banbury type internal mixer, and sulfur and the vulcanizing accelerator were then added to the resultant master batch in an open roll mill to prepare rubber compositions. Tables 4 to 8 show the measured results of tests, i.e., wear resistance, workability and carbon dispersibility of the respective rubber compositions.

Table 9 shows characteristic values of CTAB method surface areas and of 24M4DBP absorption values of carbon blacks A to E used in the examples in Tables 1 to 8. Furthermore, Table 10 shows characteristic values of the $ML_{1+4}$ (100° C.) [Mooney viscosity] of high-cis BRs A to C used in the examples in Tables 4 to 8.

(2) Tests
(1) Wear resistance

Separately from a tire used to evaluate controllability and stability, a tread of a tire was cut into two portions on the periphery of the tire, and for one of the tread, the tire having the tread formed from a tread rubber composition of Comparative Example 1 was prepared for a test. This test tire was run on the surface of a paved road as much as 50,000 km, and a depth of wear was then measured. Afterward, mileages required to wear a depth of 1 mm were compared, and they were represented with indexes, assuming the mileage of Comparative Example 1 to be 100. It is meant that the larger the index is, the better the wear resistance is. (2) Workability The workability was evaluated by a Mooney viscosity. This Mooney viscosity was measured at 100° C. by the use of a Mooney viscometer made by Shimadzu Seisakusho Ltd.

The workability test was carried out in accordance with JIS K6300 to obtain an $ML_{1+4}$ (a Mooney viscosity value after preheating for 1 minute and then driving for 4 minutes). It is meant that the smaller the index is, the better the workability is.

(3) Carbon dispersibility

A degree of dispersion was measured in accordance with an ASTM D-2663B method by the use of a microscope. It is meant that the larger the index is, the better the dispersibility is.

TABLE 1

|  | Example 1 | Example 2 | Comp. Ex. 1 | Example 3 | Comp. Ex. 2 |
|---|---|---|---|---|---|
| Natural rubber | 100.0 | 100.0 | 100.0 | 100.0 | 100.0 |
| Carbon black A | 60.0 | 60.0 | 60.0 | 60.0 | 60.0 |
| Stearic acid | 2.0 | 2.0 | 2.0 | 2.0 | 2.0 |
| Zinc white | 3.0 | 3.0 | 3.0 | 3.0 | 3.0 |
| Sulfur | 1.0 | 1.0 | 1.0 | 1.0 | 1.0 |
| Vulcanizing accelerator (CZ) | 1.2 | 1.2 | 1.2 | 1.2 | 1.2 |
| Antioxidant | 1.0 | 1.0 | 1.0 | 1.0 | 1.0 |
| DCO-FA[*1] | 2.0 | 4.0 | 0.0 | 15.0 | — |
| Additive 2[*2] | — | — | — | — | 2.0 |
| Wear resistance (Index) | 120 | 115 | 100 | 110 | 92 |
| Workability (Index) | 95 | 90 | 110 | 72 | 96 |
| Carbon dispersibility (Index) | 110 | 110 | 100 | 100 | 101 |

[*1]DCO-FA was a dehydrated castor oil fatty acid containing 35% by weight of a conjugated diene acid and having an iodine value of 156 (the same shall apply to Tables 1 to 8).
[*2]A dehydrated castor oil.

TABLE 2

|  | Comp. Ex. 3 | Comp. Ex. 4 | Comp. Ex. 5 | Comp. Ex. 6 | Comp. Ex. 7 | Comp. Ex. 8 |
|---|---|---|---|---|---|---|
| Natural rubber | 100.0 | 100.0 | 100.0 | 100.0 | 100.0 | 100.0 |
| Carbon black A | 60.0 | 60.0 | — | — | — | — |
| Carbon black B | — | — | 60.0 | 60.0 | — | — |
| Carbon black C | — | — | — | — | 60.0 | 60.0 |
| Stearic acid | 2.0 | 2.0 | 2.0 | 2.0 | 2.0 | 2.0 |
| Zinc White | 3.0 | 3.0 | 3.0 | 3.0 | 3.0 | 3.0 |
| Sulfur | 1.0 | 1.0 | 1.0 | 1.0 | 1.0 | 1.0 |
| Vulcanizing accelerator (CZ) | 1.2 | 1.2 | 1.2 | 1.2 | 1.2 | 1.2 |
| Antioxidant | 1.0 | 1.0 | 1.0 | 1.0 | 1.0 | 1.0 |
| DCO-FA | — | — | 2.0 | 0.0 | 2.0 | 0.0 |
| Additive 3[*3] | 2.0 | — | — | — | — | — |
| Additive 4[*4] | — | 2.0 | — | — | — | — |
| Wear resistance | 98 | 97 | 92 | 90 | 90 | 86 |
| Workability | 100 | 100 | 122 | 156 | 120 | 132 |
| Carbon dispersibility | 100 | 100 | 90 | 80 | 90 | 82 |

[*3]Oleic acid.
[*4]A mixture of DCO-FA and linoleic acid in a mixing ratio of 1:1.

TABLE 3

|  | Comp. Ex. 9 | Comp. Ex. 10 | Comp. Ex. 11 | Comp. Ex. 12 | Comp. Ex. 13 | Comp. Ex. 14 |
|---|---|---|---|---|---|---|
| Natural rubber | 100.0 | 100.0 | 100.0 | 100.0 | 100.0 | 100.0 |
| Carbon black A | — | — | — | — | 30.0 | 100.0 |
| Carbon black D | 60.0 | 60.0 | — | — | — | — |
| Carbon black E | — | — | 60.0 | 60.0 | — | — |
| Stearic acid | 2.0 | 2.0 | 2.0 | 2.0 | 2.0 | 2.0 |
| Zinc white | 3.0 | 3.0 | 3.0 | 3.0 | 3.0 | 3.0 |
| Sulfur | 1.0 | 1.0 | 1.0 | 1.0 | 1.0 | 1.0 |
| Vulcanizing accelerator (CZ) | 1.2 | 1.2 | 1.2 | 1.2 | 1.2 | 1.2 |
| Antioxidant | 1.0 | 1.0 | 1.0 | 1.0 | 1.0 | 1.0 |
| DCO-FA | 2.0 | 0.0 | 2.0 | 0.0 | 2.0 | 0.0 |
| Wear resistance | 97 | 94 | 87 | 80 | 81 | 88 |
| Workability | 85 | 93 | 75 | 83 | 61 | 166 |
| Carbon dispersibility | 102 | 100 | 121 | 110 | 121 | 80 |

TABLE 4

|  | Example 4 | Comp. Ex. 15 | Example 5 | Comp. Ex. 16 | Example 6 | Comp. Ex. 17 |
|---|---|---|---|---|---|---|
| Natural rubber | 70.0 | 70.0 | 50.0 | 50.0 | 90.0 | 90.0 |
| High-cis BR A | 30.0 | 30.0 | 50.0 | 50.0 | 10.0 | 10.0 |
| Carbon black A | 60.0 | 60.0 | 60.0 | 60.0 | 60.0 | 60.0 |
| Stearic acid | 2.0 | 2.0 | 2.0 | 2.0 | 2.0 | 2.0 |
| Zinc white | 3.0 | 3.0 | 3.0 | 3.0 | 3.0 | 3.0 |
| Sulfur | 1.0 | 1.0 | 1.0 | 1.0 | 1.0 | 1.0 |
| Vulcanizing accelerator (CZ) | 1.2 | 1.2 | 1.2 | 1.2 | 1.2 | 1.2 |
| Antioxidant | 1.0 | 1.0 | 1.0 | 1.0 | 1.0 | 1.0 |
| DCO-FA | 2.0 | 0.0 | 2.0 | 0.0 | 2.0 | 0.0 |
| Wear resistance | 120 | 100 | 130 | 99 | 98 | 85 |
| Workability | 90 | 100 | 95 | 130 | 80 | 100 |
| Carbon dispersibility | 110 | 90 | 100 | 80 | 110 | 95 |

TABLE 5

|  | Example 7 | Comp. Ex. 18 | Example 8 | Comp. Ex. 19 | Comp. Ex. 20 | Comp. Ex. 21 |
|---|---|---|---|---|---|---|
| Natural rubber | 20.0 | 20.0 | 60.0 | 30.0 | 70.0 | 70.0 |
| High-cis BR A | 80.0 | 80.0 | 30.0 | 30.0 | — | — |
| High-cis BR B | — | — | — | — | 30.0 | 30.0 |
| IR2200*5 | — | — | 10.0 | 40.0 | — | — |
| Carbon black A | 60.0 | 60.0 | 60.0 | 60.0 | 60.0 | 60.0 |
| Stearic acid | 2.0 | 2.0 | 2.0 | 2.0 | 2.0 | 2.0 |
| Zinc white | 3.0 | 3.0 | 3.0 | 3.0 | 3.0 | 3.0 |
| Sulfur | 1.0 | 1.0 | 1.0 | 1.0 | 1.0 | 1.0 |
| Vulcanizing accelerator (CZ) | 1.2 | 1.2 | 1.2 | 1.2 | 1.2 | 1.2 |
| Antioxidant | 1.0 | 1.0 | 1.0 | 1.0 | 1.0 | 1.0 |
| DCO-FA | 2.0 | 0.0 | 2.0 | 0.0 | 2.0 | 0.0 |
| Wear resistance | 99 | 92 | 115 | 90 | 98 | 95 |
| Workability | 140 | 160 | 100 | 100 | 86 | 89 |
| Carbon dispersibility | 60 | 50 | 110 | 100 | 106 | 103 |

*5 Isoprene rubber (trade name of a rubber made by Japan Synthetic Rubber Co., Ltd.)

TABLE 6

|  | Example 9 | Comp. Ex. 22 | Comp. Ex. 23 | Comp. Ex. 24 | Comp. Ex. 25 | Comp. Ex. 26 |
|---|---|---|---|---|---|---|
| Natural rubber | 70.0 | 70.0 | 70.0 | 70.0 | 70.0 | 70.0 |
| High-cis BR A | — | — | 30.0 | 30.0 | 30.0 | 30.0 |
| High-cis BR C | 30.0 | 30.0 | — | — | — | — |
| Carbon black A | 60.0 | 60.0 | — | — | — | — |
| Carbon black B | — | — | 60.0 | 60.0 | — | — |
| Carbon black C | — | — | — | — | 60.0 | 60.0 |
| Stearic acid | 2.0 | 2.0 | 2.0 | 2.0 | 2.0 | 2.0 |
| Zinc white | 3.0 | 3.0 | 3.0 | 3.0 | 3.0 | 3.0 |
| Sulfur | 1.0 | 1.0 | 1.0 | 1.0 | 1.0 | 1.0 |
| Vulcanizing accelerator (CZ) | 1.2 | 1.2 | 1.2 | 1.2 | 1.2 | 1.2 |
| Antioxidant | 1.0 | 1.0 | 1.0 | 1.0 | 1.0 | 1.0 |
| DCO-FA | 2.0 | 0.0 | 2.0 | 0.0 | 2.0 | 0.0 |
| Wear resistance | 104 | 98 | 80 | 80 | 109 | 108 |
| Workability | 127 | 156 | 140 | 150 | 137 | 143 |
| Carbon dispersibility | 80 | 50 | 50 | 50 | 103 | 103 |

TABLE 7

|  | Comp. Ex. 27 | Comp. Ex. 28 | Example 10 | Comp. Ex. 29 | Comp. Ex. 30 |
| --- | --- | --- | --- | --- | --- |
| Natural rubber | 70.0 | 70.0 | 70.0 | 70.0 | 70.0 |
| High-cis BR A | 30.0 | 30.0 | 30.0 | 30.0 | 30.0 |
| Carbon black A | 30.0 | 30.0 | 90.0 | 90.0 | 60.0 |
| Stearic acid | 2.0 | 2.0 | 2.0 | 2.0 | 2.0 |
| Zinc white | 3.0 | 3.0 | 3.0 | 3.0 | 3.0 |
| Sulfur | 1.0 | 1.0 | 1.0 | 1.0 | 1.0 |
| Vulcanizing accelerator (CZ) | 1.2 | 1.2 | 1.2 | 1.2 | 1.2 |
| Antioxidant | 1.0 | 1.0 | 1.0 | 1.0 | 1.0 |
| DCO-FA | 2.0 | 0.0 | 2.0 | 0.0 | — |
| Additive 2*[2] | — | — | — | — | 2.0 |
| Wear resistance | 72 | 72 | 99 | 88 | 95 |
| Workability | 68 | 71 | 152 | 168 | 103 |
| Carbon dispersibility | 121 | 120 | 70 | 60 | 95 |

*[2] A dehydrated castor oil.

TABLE 8

|  | Comp. Ex. 31 | Comp. Ex. 32 | Comp. Ex. 33 | Comp. Ex. 34 | Comp. Ex. 35 | Comp. Ex. 36 |
| --- | --- | --- | --- | --- | --- | --- |
| Natural rubber | 70.0 | 70.0 | 70.0 | 70.0 | 70.0 | 70.0 |
| High-cis BR A | 30.0 | 30.0 | 30.0 | 30.0 | 30.0 | 30.0 |
| Carbon black A | 30.0 | 30.0 | 90.0 | 90.0 | 60.0 | 60.0 |
| Stearic acid | 2.0 | 2.0 | 2.0 | 2.0 | 2.0 | 2.0 |
| Zinc white | 3.0 | 3.0 | 3.0 | 3.0 | 3.0 | 3.0 |
| Sulfur | 1.0 | 1.0 | 1.0 | 1.0 | 1.0 | 1.0 |
| Vulcanizing accelerator (CZ) | 1.2 | 1.2 | 1.2 | 1.2 | 1.2 | 1.2 |
| Antioxidant | 1.0 | 1.0 | 1.0 | 1.0 | 1.0 | 1.0 |
| DCO-FA | — | — | 0.05 | 22.0 | 2.0 | 0.0 |
| Additive 3*[3] | 2.0 | — | — | — | 2.0 | — |
| Additive 4*[4] | — | 2.0 | — | — | — | 2.0 |
| Aroma oil | — | — | — | — | 10.0 | 10.0 |
| Wear resistance | 95 | 101 | 92 | 94 | 95 | 86 |
| Workability | 104 | 110 | 90 | 100 | 90 | 87 |
| Carbon dispersibility | 98 | 100 | 110 | 110 | 98 | 106 |

*[3] Oleic acid.
*[4] A mixture of DCO-FA and linoleic acid in a mixing ratio of 1:1.

TABLE 9

|  | CTAB Method Surface Area ($m^2/g$) | 24M4DBP (ml/g) |
| --- | --- | --- |
| Carbon black A | 180 | 125 |
| Carbon black B | 230 | 120 |
| Carbon black C | 180 | 160 |
| Carbon black D | 180 | 80 |
| Carbon black E | 100 | 80 |

TABLE 10

|  | Mw | Mw/Mn | $ML_{1+4}$ (100° C.) |
| --- | --- | --- | --- |
| High-cis BR A | 550,000 | 2.8 | 43 |
| High-cis BR B | 360,000 | 3.9 | 30 |
| High-cis BR C | 1,000,000 | 2.9 | 130 |

Consideration of Tables 1 to 3

Examples 1 to 3 are concerned with rubber compositions for tire treads in which carbon blacks and organic unsaturated fatty acids having characteristic values and blend ratios in the claims of the present invention are blended with 100 parts by weight of a natural rubber. Thus, it is apparent that these rubber compositions are excellent in wear resistance and have low Mooney viscosity values, and therefore workability and carbon dispersibility are good.

On the contrary, Comparative Examples 1 to 14 are concerned with rubber compositions for tire treads in which carbon blacks and various organic unsaturated fatty acids having changed characteristic values and blend ratios are blended with 100 parts by weight of a natural rubber.

That is to say, in Comparative Example 1, the blend ratio of the organic unsaturated fatty acid of the present invention is outside the range of the present invention; in Comparative Examples 2 to 4, the organic unsaturated fatty acid of the present invention is not used; in Comparative Examples 5 to 12, characteristic values of CTAB method surface areas and 24M4DBP absorption values of the carbon blacks of the present invention are outside the range of the present invention; and in Comparative Examples 13 and 14, amounts of the carbon blacks of the present invention are outside the range of the present invention.

It is apparent that in Comparative Examples 1 to 14, the wear resistance is poor and Mooney viscosity values are high, so that workability and carbon dispersibility are also poor.

Consideration of Tables 4 to 8

Examples 4 to 10 are concerned with rubber compositions for tire treads in which carbon blacks and organic unsaturated fatty acids having characteristic values and blend ratios in the claims of the present invention are blended with 100 parts by weight of mixed rubbers comprising natural rubbers and high-cis BRs in various mixing ratios. It is apparent that these rubber compositions are excellent in wear resistance and have low Mooney viscosity values, and therefore workability and carbon dispersibility both are good.

On the contrary, Comparative Examples 15 to 36 are concerned with rubber compositions for tire treads in which carbon blacks and various organic unsaturated fatty acids having changed characteristic values and blend ratios are blended with 100 parts by weight comprising mixed rubbers of natural rubbers and high-cis BRs in various mixing ratios.

That is to say, in Comparative Examples 15 to 18, the mixing ratios of the mixed rubbers comprising the natural rubbers and the high-cis BRs and the blend ratios of the organic unsaturated fatty acids of the present invention are outside the range of the present invention; in Comparative Example 19, the mixing ratio of the mixed rubber comprising the natural rubber and the high-cis BR is outside the range of the present invention; in Comparative Examples 20 to 22, characteristic values of the high-cis BRs of the present invention are outside the range of the present invention; in Comparative Examples 23 to 26, characteristic values of CTAB method surface areas and 24M4DBP absorption values of the carbon blacks of the present invention are outside the range of the present invention; in Comparative Examples 27 and 28, the blend ratios of the carbon blacks of the present invention are outside the range of the present invention; in Comparative Examples 29 to 32, the organic unsaturated fatty acid of the present invention are outside the range of the present invention; in Comparative Examples 33 and 34, the blend ratios of the organic unsaturated fatty acids of the present invention are outside the range of the present invention; and in Comparative Examples 35 and 36, the organic unsaturated fatty acid of the present invention is mixed with organic unsaturated fatty acids outside the range of the present invention.

In Comparative Examples 15 to 36, it is apparent that the wear resistance is poor, the Mooney viscosity is high, so that workability and carbon dispersibility both are bad.

Possibility of Industrial Utilization

As described above, a rubber composition for a tire tread regarding the present invention has a low Mooney viscosity, so that workability and carbon dispersibility both are good. Thus, this rubber composition for the tire tread can be suitably used for a pneumatic tire for heavy load having an excellent wear resistance.

We claim:

1. A rubber composition for a tire tread which is obtained by blending 100 parts by weight of a natural rubber and/or a diene synthetic rubber with 40 to 100 parts by weight of a carbon black having characteristic values of a cetyltriammonium bromide adsorption specific surface area (CTAB) being 90 to 220 $m^2/g$ and a 24M4DBP absorption value being 90 to 140 ml/100 g, and 0.1 to 20 parts by weight of an organic unsaturated fatty acid having two or more carbon double bonds in its molecule which includes 35% by weight or more of a conjugated diene acid having at least one conjugated carbon-carbon double bonds in its molecule.

2. The rubber composition for a tire tread according to claim 1 wherein the carbon black has a cetyltriammonium bromide adsorption specific surface area (CTAB) of 120 to 220 $m^2/g$ and a 24M4DBP absorption value of 100 to 140 ml/100 g.

3. The rubber composition for a tire tread according to claim 1 wherein the diene synthetic rubber is one selected from the group consisting of a polybutadiene, a styrene·butadiene copolymer rubber, a synthetic polyisoprene rubber, a chloroprene rubber, a butyl rubber and an ethylene·propylene terpolymer rubber.

4. The rubber composition for a tire tread according to claim 1 wherein the natural rubber and/or a cis-1,4-polybutadiene rubber is contained in an amount of 70% by weight or more in 100 parts by weight of the total rubber components.

5. The rubber composition for a tire tread according to claim 4 wherein the cis-1,4-polybutadiene rubber has characteristic values of the following (a):

(a) an Mw is 400,000 or more and an Mw/Mn is less than 4.0 wherein the Mw is a weight-average molecular weight and an Mn is a number-average molecular weight.

6. The rubber composition for a tire tread according to claim 4 or 5 wherein a mixing ratio of the natural rubber and the cis-1,4-polybutadiene rubber is such that the amount of the natural rubber is 70% by weight or more.

\* \* \* \* \*